United States Patent
Ohrmann (10) Patent No.: US 10,478,951 B2
(45) Date of Patent: Nov. 19, 2019

(54) DEVICE, MODULAR CONSTRUCTION SYSTEM AND METHOD FOR INSERTING AN ELASTIC RING INTO AN INNER GROOVE

(71) Applicant: OHRMANN MONTAGETECHNIK GMBH, Moehnesee (DE)

(72) Inventor: Coelestin Ohrmann, Moehnesee (DE)

(73) Assignee: OHRMANN MONTAGETECHNIK GMBH (DE)

( * ) Notice: Subject to any disclaimer, the term of this patent is extended or adjusted under 35 U.S.C. 154(b) by 255 days.

(21) Appl. No.: 15/586,106

(22) Filed: May 3, 2017

(65) Prior Publication Data

US 2017/0320201 A1  Nov. 9, 2017

(30) Foreign Application Priority Data

May 4, 2016 (DE) .................. 10 2016 108 336

(51) Int. Cl.
*B25B 27/00* (2006.01)

(52) U.S. Cl.
CPC .................. *B25B 27/0028* (2013.01)

(58) Field of Classification Search
CPC ... B25B 27/0028; B25B 27/20; B25B 27/205; B23P 19/084; B23B 31/16241; Y10T 29/5363
See application file for complete search history.

(56) References Cited

U.S. PATENT DOCUMENTS

| | | | |
|---|---|---|---|
| 4,571,804 A | 2/1986 | Grabler et al. | 29/235 |
| 8,671,533 B2 | 3/2014 | Haag et al. | 29/235 |
| 2007/0271753 A1* | 11/2007 | Haag | B23B 31/16241 |
| | | | 29/235 |

FOREIGN PATENT DOCUMENTS

| | | | |
|---|---|---|---|
| DE | 3710829 | 10/1987 | ............ B23P 19/04 |
| DE | 4319442 | 12/1994 | ............ B65G 47/14 |
| DE | 10204733 | 8/2003 | ............ B25B 27/14 |
| DE | 102005007932 | 8/2013 | ............ B23B 31/16 |
| EP | 2258514 | 12/2010 | ............ B25B 27/00 |
| JP | H03251325 | 11/1991 | ............ B23P 19/02 |
| JP | H09323226 | 12/1997 | ............ B23P 19/02 |
| JP | H1133842 | 2/1999 | ............ B23P 19/02 |
| SU | 1110596 | 8/1984 | ............ B23P 19/08 |

OTHER PUBLICATIONS

European Search Report (w/machine translation) issued in application No. 17169018.3, dated Sep. 25, 2017 (14 pgs).
XP-002773234, Database WPI Week 198511, Thomson Scientific, London GB, AN 1985-067743 (1 pg).
German Office Action (w/English summary) issued in application No. 10 2016 108 336.4, dated Mar. 27, 2018 (6 pgs).

* cited by examiner

*Primary Examiner* — Lee A Holly
(74) *Attorney, Agent, or Firm* — Hayes Soloway P.C.

(57) ABSTRACT

A device, a modular construction system and a method for inserting an elastic ring into an inner groove of a workpiece opening provides that the device the ring is fixed by multiple retainers to specific retaining regions and between the retaining regions said ring acquires a wavy shape or crown shape in an axial direction.

20 Claims, 7 Drawing Sheets

DEVICE, MODULAR CONSTRUCTION SYSTEM AND METHOD FOR INSERTING AN ELASTIC RING INTO AN INNER GROOVE

FIELD OF THE INVENTION

The invention relates to a device, a modular construction system and a method for inserting an elastic ring into an inner groove in a workpiece opening.

BACKGROUND

Elastic rings that are inserted into inner grooves in workpieces are usually embodied from an elastomer and used as sealing rings. They usually have a diameter/thickness ratio of >10 and usually also a hardness <70 Shore. However, the invention is not limited to these values, these values do however define ranges in which the elastic rings are particularly unstable and consequently it is difficult to insert said elastic rings automatically into an inner groove in an automated manner. O-rings are the most frequent type of these sealing rings. Rings that have sealing lips are even more difficult to install since the lips themselves are extremely unstable and make it more difficult to perform the installation procedure in an automated manner.

In order to make it possible to install the elastic rings into the inner grooves, said elastic rings must first be deformed and must either be pulled or pushed into the workpiece opening in the region of the groove. The term "pulling" a ring is used if the cord forming the ring is subject to tensile stress and the term "pushing" is used if the cord is subjected to a compression load. A problem arises when inserting the ring into the groove if the ring lies in the region of the groove but must then be pushed into the groove along the complete circumference. In this case, the ring is compressed, which means that the compression load on the cord leads to the cross-section of the cord being increased in particular regions. This is detrimental for the positioning of the ring in the groove itself. Forces occur that produce uncontrollable deformations of the ring and can lead to the ring becoming damaged as it is inserted into the groove. In particular the friction forces between the ring and the workpiece, the extent of the compression, but also the fluctuating qualities of the rings with regard to their material, their surface quality and their hardness result in the compression of the rings making it extremely difficult to perform the installation procedure in an automated manner.

DE 37 10 829 A1 discloses a device for installing sealing rings, wherein a tool is placed on the workpiece and an axially displaceable finger grasps the sealing ring at a site on its circumference and then pulls said sealing ring into a transition sleeve, the inner cross-section of which corresponds to the inner cross-section of the workpiece opening. The ring is deformed into an oval that lies in an inclined manner in the sleeve. If the retaining region of the ring on which the finger is engaging has arrived at the groove, this retaining region is pushed into the groove by means of a rocking movement at the finger. A trailing slider then pushes the rest of the ring in the direction towards the groove so that said ring can then slide into the groove. It must also be possible for the ring to slide in the bottom of the groove so as to perform compensating movements which could be more difficult as a result of the high friction in the region of the bottom of the groove. Sliding means in particular in the form of oil is intended to reduce problems and can reduce problems. The known device is widely used in practice.

Furthermore, there are however alternative solutions that use a completely different technique. In this case, the ring is compressed in the ring plane (radial plane with regard to the non-deformed state) so that the ring diameter is reduced in size. In so doing, the ring must be retained between two plates since said ring is not to bulge out of the plane. DE 43 19 442 A1 discloses a corresponding compression drawer. In this case, the ring is compressed radially so uniformly inwards that it retains its circular shape. The ring must then be retained between two planar surfaces and inserted into the workpiece opening. As soon as the ring has arrived at the groove, the ring can relax and as a result of its intrinsic stress jump into the groove. This method has particular limits with regard to the dimensions and rigidity values of the rings since a high degree of compression is required.

If it is not possible to achieve this degree of compression, other installation variants can be used, wherein the ring likewise remains in its plane and is deformed only in the plane. By way of example, it is feasible to push the ring radially from one side inwards so that it assumes a kidney shape. Further other ideas also provide to push the ring with multiple fingers inwards in the ring plane in order to provide the ring with a clover leaf shape. As a result of its elasticity and intrinsic rigidity, the ring upon arriving at the groove jumps into the groove in a uniform as possible manner over the entire circumference in the case of all these variants.

It is the object of the invention to provide a device, a modular construction system and a method for inserting an elastic ring, in particular a sealing ring, into an inner groove of a workpiece opening and said device, modular construction system and method are to be extremely process-reliable and universally useable with respect to the geometric and material characteristics of the ring and also with respect to the geometries and dimensions of the ring in relation to the dimensions of the groove and the workpiece opening. It is namely necessary in the prior art to match the device very precisely to the specific ring and the workpiece.

SUMMARY

The present invention provides a device for inserting an elastic ring into an inner groove in a workpiece opening having:

at least two retainers that are circumferentially spaced apart from one another and can be pushed into the workpiece opening with regard to an axial insertion direction, each of said retainers having a radially outwards open recess for retaining regions on the ring, wherein the device is configured so that the ring that sits in the recesses can deform between its retaining regions to form a wavy shape seen in the lateral view in order to form trailing, curved regions, and at least one slider for pushing the trailing, curved regions in the direction towards the inner groove, wherein the device is configured such that the slider can be moved into the workpiece opening in a trailing manner with respect to the recesses.

The invention does not use the previously mentioned technology that has been applied very frequently in recent years, whereby the ring is deformed in the ring plane. The invention follows a completely different path in that multiple retainers are provided that receive the ring and consequently function in a position-fixing manner during the insertion procedure into the workpiece opening. The ring is deformed out of the ring plane and also does not assume an oval shape, as is explained in DE 37 10 829 A1, but rather assumes a type of circumferential wavy shape or crown shape. The axial extent of the ring that is deformed in this manner is thus considerably less than in the prior art. Consequently, the trailing slider must move the trailing regions of the ring over an essentially smaller axial forward feed region which considerably increases the reproducibility of the installation procedure, considerably reduces the installation problems and ensures a constant quality of the optimal position of the ring in the groove.

The device in accordance with the invention is constructed in an extremely simple manner using few parts. The wavy shape or crown shape of the deformed ring when moving said ring in the direction towards the groove renders it possible to have a large magnitude of tolerance with regard to the rings being used since the entire length of the "cord" can be very different on an axially very short installation space. This means that the device can be used for different ring dimensions and groove dimensions within a greater range than is the case with the known devices. It is not necessary to perform a costly conversion, on the contrary the same device can be used in large families of parts (similar ring dimensions and similar groove dimensions).

Some or even all the recesses should lie in the same radial plane, in other words the retaining regions of the ring that lie in these recesses arrive simultaneously at the groove. In certain cases, it can also be advantageous to allow one or the other recess to follow on depending upon the rigidity and dimension of the ring. Such an adaptation can be achieved relatively easily since in this case it is only necessary to produce different retainers.

The retainers are configured in particular as identical parts and this reduces the costs for producing the device.

The preferred embodiment of the invention provides that the retainers are configured as elongated fingers.

The retainers can be distributed uniformly or non-uniformly over the circumference, this can also be very easily adapted and, depending upon the framework conditions, in particular to suit the characteristics and the geometry and dimension of the ring.

As already mentioned, at least one slider is provided. This means that it is possible to use a single slider having a contact surface that pushes forward the trailing curved regions. In this case, it is by way of example advantageous if the slider has a contact surface or contact surfaces lying in a radial plane so that the furthest trailing curved regions, in other words, the "valleys" of the waves of the ring, push against the slider and are pushed simultaneously and uniformly in the direction towards the groove. However, it can also be advantageous in order to improve the force transmission into the ring if the end face of the slider, at least in the region of the edge where it makes contact with the ring, is adapted to suit the wavy shape or crown shape of the ring. The curved regions are transported by way of a combined pull-push movement in the direction towards the groove.

Another embodiment of the invention provides that multiple sliders are provided, by way of example a slider can be provided in each intermediate space between adjacent retainers.

Moreover, the slider can have radially outwards moving contact surfaces for the ring so as to change the radial expansion of the slider.

One variant of the invention provides that the at least one slider and the retainers can be moved axially one after the other, in particular independently of one another. This means that the retainers can then, if they have inserted the retaining regions into the groove, subsequently secure these retaining regions in the groove if the slider is finally moved axially and relative to the retainers.

All the movements of the parts can be performed manually or in a motorized manner, by way of example also by way of pneumatic cylinders, reciprocating magnets, resilient elements, electric motors or the like. Pneumatic actuators in particular have proved in this case to be robust, cost-effective and universally useable.

The retainers in turn can be mounted all together, jointly in groups or also independently of one another, in such a manner as to be able to move in an axial and/or radial manner relative to the rest of the device. They can be coupled to one another in a mechanical manner, in particular coupled to one another in a rigid manner, or completely uncoupled from one another. Consequently, it is possible to perform different movement sequences. The radial moveability is particularly advantageous in order to be able to adapt the retainers in the region of the recess to suit different diameters of the workpiece opening and in order when using a funnel-shaped inlet to move the retainer during the movement along the funnel in an axially inwards manner so that it can adjust its shape and contour.

As mentioned, the retainers can be moved by way of one or multiple actuators, and/or by way of sliding guides or a sliding guide. The fingers can perform a parallel movement, a pivot movement or a combination thereof. The term "parallel movement" is understood to mean a movement in the axial direction. The retainers can be moved radially outwards by means of being resiliently pre-stressed. In this case, it is ensured that the outwards thrusting retainers lie against the inner face either of a mouthpiece as part of the device or against the inner face of the wall that forms the workpiece opening and a gap into which the ring would otherwise be pushed in and become jammed is not formed.

A carrier that usually remains outside the workpiece opening as the ring is inserted into the workpiece opening is provided for mounting the retainers. It is possible to provide by way of example a pivot bearing for retainers on this carrier.

In order to align the slider in the best possible manner with respect to the retainers, it is feasible to provide the carrier with a guide for the slider. The carrier is by way of example the end-face end of the device, said end-face end of said device faces away from the workpiece and a guide borehole then extends through said device. A drive spigot that extends through the guide borehole can be actuated from outside and is fastened between the carrier and the workpiece to the slider. Naturally, the slider can also be connected as one piece to the drive spigot. The slider and retainers are aligned in such a manner that the slider is arranged radially between the retainers at least during the insertion movement into the workpiece opening. This means that space for the trailing slider is provided in the circumferential direction between the retainers.

A particularly simple and compact embodiment that also ensures the gaps between individual parts are small resides in the fact that the slider has at least one slot for receiving at least one retainer. This slot extends axially at the peripheral surface of the slider so that the retainer can move down into the slot to a greater or lesser extent. This is advantageous particularly in combination with the pivot bearing of the retainers.

The device in accordance with the invention is equipped in particular with a mouthpiece that is placed against the workpiece and is provided with a guiding aperture for the ring to be pushed through in the direction towards the workpiece opening and for deforming the ring into the wavy shape or crown shape. The guiding aperture should preferably not have a greater diameter than the workpiece opening.

The mouthpiece is used to provide the ring outside the workpiece with the desired transportation geometry in which the ring can then be inserted into the workpiece opening and pushed therein.

The mouthpiece is by way of example a type of sleeve having a special inner geometry.

On the face that is facing the workpiece, the guiding aperture terminates in a so-called outlet end by way of which the ring is moved into the workpiece opening. The corresponding end of the guiding aperture is the inlet end for the ring, said end facing away from the workpiece. The guiding aperture should taper at least over sections in the direction towards the outlet end so that the outer diameter of ring that has been received in the recesses in the retainers becomes increasingly smaller and simultaneously deformed out of the plane in order to acquire the wavy shape or crown shape. It is thus not possible for the ring to tilt because the diameter of the ring is not reduced in size abruptly but rather reduces continuously and in a guided manner, as a consequence of which the material is moved out of the ring plane so that with a smaller diameter the wavy shape is always more greatly emphasized.

Naturally, it is not necessary for the narrowing section of the guiding aperture to extend continuously from one end face to the opposite end face of the mouthpiece. It is also possible, by way of example in the region of the inlet end, to provide initially a tapering section and then in the region before the outlet end to change to a continuous, in particular circular-cylindrical, section in which the ring is provided with its final transportation geometry and can also be transferred in this condition into the workpiece opening.

The narrowing section of the guiding aperture can be by way of example cone-shaped or generally taper in a conical manner. Other variants provide that ribs that protrude on the inner face are provided and said ribs are used as sliding bodies and represent in turn the contact surfaces for the then later curved regions. Consequently, the friction surface is reduced. These ribs then extend with their radial inner face in the direction towards the outlet end always closer to the middle axis at least in sections. This means that the outer diameter which the ring acquires by virtue of the ribs is reduced as a result of the ribs that extend towards the middle axis.

It is not necessary for the ribs to be a single component of the rest of the mouthpiece. Said ribs can also be embodied from a particularly advantageous material or in particular can be coated. An idea of the invention resides in the fact that the ribs are configured as sliding strips that are mounted on a wall of the mouthpiece or inserted into a groove and in fact an axial groove of the wall. Furthermore, the ribs can also be configured as bent wire parts.

Since the mouthpiece can comprise complex geometries on the inside in order to optimize the friction or the friction sites, it can be advantageous to configure the mouthpiece as a part that is produced by means of 3D-printing technology.

The retainers are configured in particular as rockers that have a front section that then comprises the recesses, and a rear section which can be engaged by an actuator.

In order to be able to adapt the device in a simpler manner to suit different ring geometries and retaining region geometries, it is possible in a modular construction system to provide multiple mouthpieces that differ in the region of the outlet end by virtue of different diameters of the guiding apertures, wherein the same slider and retainers can be coupled to each of the mouthpieces so that during the insertion procedure the retainers can make contact adjacent to their recesses with the inner face of the wall of the mouthpiece, said wall forming the respective guiding aperture. The moveability of the retainers renders it possible to adapt the retainers to suit different guiding apertures. In order to facilitate the adaptation procedure, the slider can likewise have by way of example elastically resilient edge sections or outwards moving contact surfaces that can be adapted to suit the different diameters of the guiding apertures.

The invention relates furthermore also to a method for inserting an elastic ring into an inner groove in a workpiece opening, in particular using the device in accordance with the invention. The method in accordance with the invention comprises at least the following steps:

the elastic ring is inserted with its radial inner face at retaining regions into outwards open recesses of the retainers, the retainers are moved into a guiding aperture of a mouthpiece, wherein the guiding aperture is delimited by means of a wall inner face, wherein the guiding aperture tapers at least in sections in the direction towards its outlet end that faces the workpiece, and the retainers are positioned in the mouthpiece in such a manner that the elastic ring can contact the wall inner face at least with its regions that lie between the recesses in the retainer and these regions become curved in the direction opposite to the insertion direction during the movement into the mouthpiece and form trailing, curved regions, the ring is moved through the mouthpiece into the workpiece opening by means of the retainers, in the region of the groove, the retaining regions are transferred into the groove, and a slider is moved into the workpiece opening in order to push the trailing curved regions of the ring axially towards the groove.

Furthermore, the method in accordance with the invention can be further improved by means of the steps previously mentioned in conjunction with the device.

The method in accordance with the invention is also optimized by virtue of the fact that multiple mouthpieces are provided that represent a type of adapter set. These mouthpieces have different diameters with regard to the guiding apertures in the region of the outlet end. The same slider and the same retainers are used in order to insert different rings into the groove, depending upon the diameter of the workpiece opening, by means of an adapted mouthpiece together with the slider and the retainer.

The mouthpiece can be generally cylindrical, conical, star-shaped or also any other shape. The term "star-shaped" refers to the radial section.

The invention is characterized in that, by virtue of deforming the ring to produce a three-dimensional wavy shape or crown shape, the ring can be transported into the workpiece without compressing or bending the ring. This shape of the ring also renders it possible to use the trailing slider without excessively compressing or bending the ring as it is pushed into the groove. Moreover, it is possible by means of the invention also to install in an automated manner rings whose large volume would not allow such rings to be compressed or deformed in the known compression drawer or rings that would become damaged during the necessary compression or deformation procedure, which is particularly the case where the sealing edges (lip seals) are fragile.

DETAILED DESCRIPTION

Figure 1:
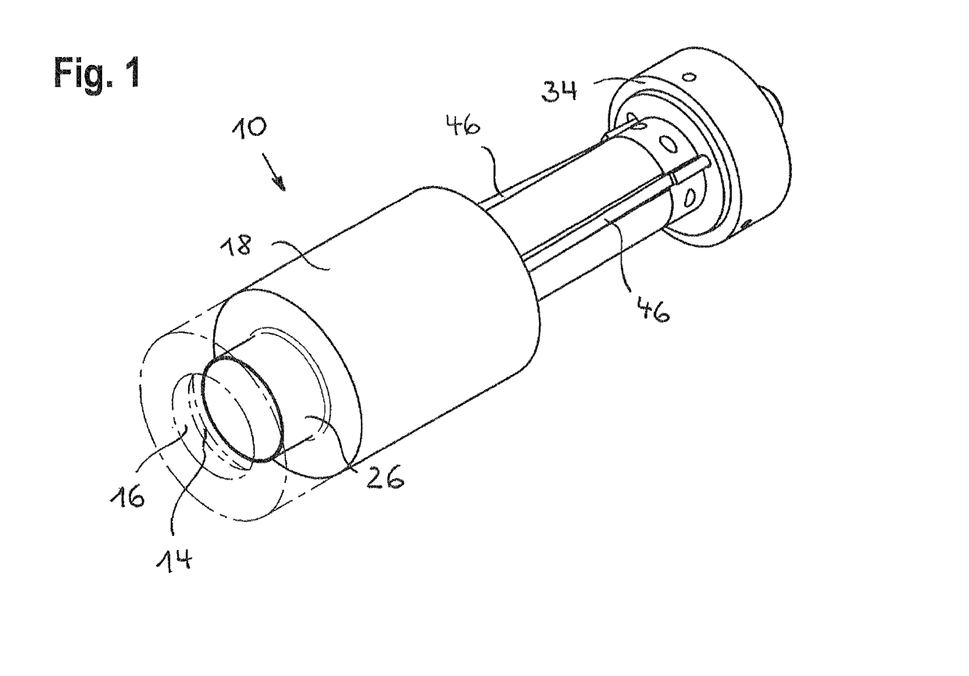
FIG. 1 illustrates a perspective view of a first embodiment of the device in accordance with the invention in a first method step prior to inserting the ring into the workpiece opening.
Figure 2:
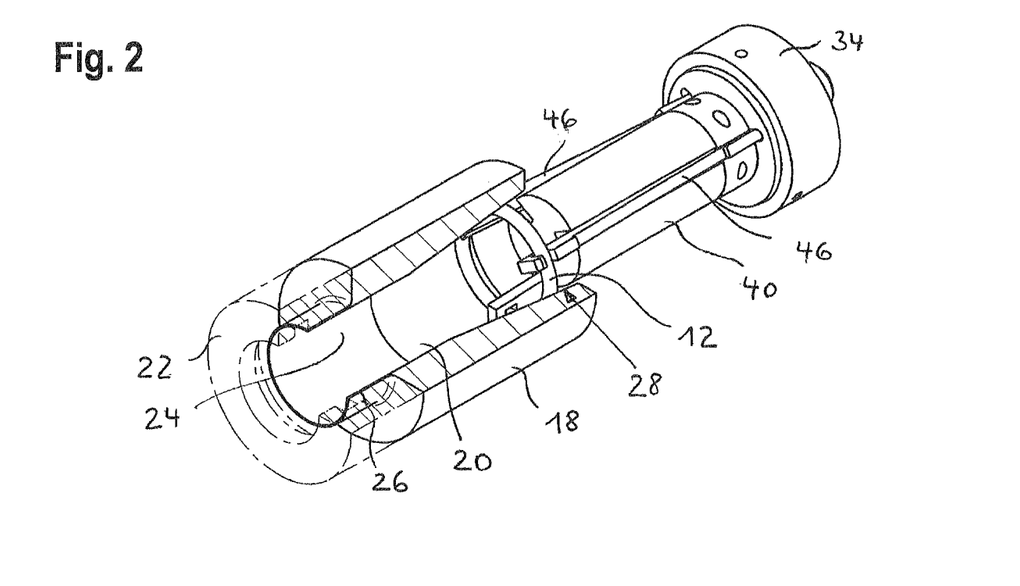
FIG. 2 illustrates a partial sectional view of the device shown in FIG. 1.

FIGS. 1 and 2 illustrate a device 10 for inserting an elastic ring 12, in particular a sealing ring such as for example an O-ring, into an inner groove 14 in a workpiece opening 16. The device comprises a so-called mouthpiece 18, in this case in the form of a type of sleeve that comprises a guiding aperture 20 in its inside. The guiding aperture 20 has two opposite ends, namely an outlet end 24 that faces the workpiece 22 and that is extended in length in the present case by means of a thin-walled cylindrical insert 26 that is inserted into the workpiece opening 16. The opposite end of the guiding aperture 20 is the inlet end 28.

The diameter of the guiding aperture 20 at its outlet end 24 is essentially, except for the minimal wall thickness of the cylindrical insert 26, identical to the diameter of the workpiece opening 16. Without the cylindrical insert 26, the guiding aperture 20 would also have in the region of the outlet end 24 the diameter of the workpiece opening.

Figure 3:
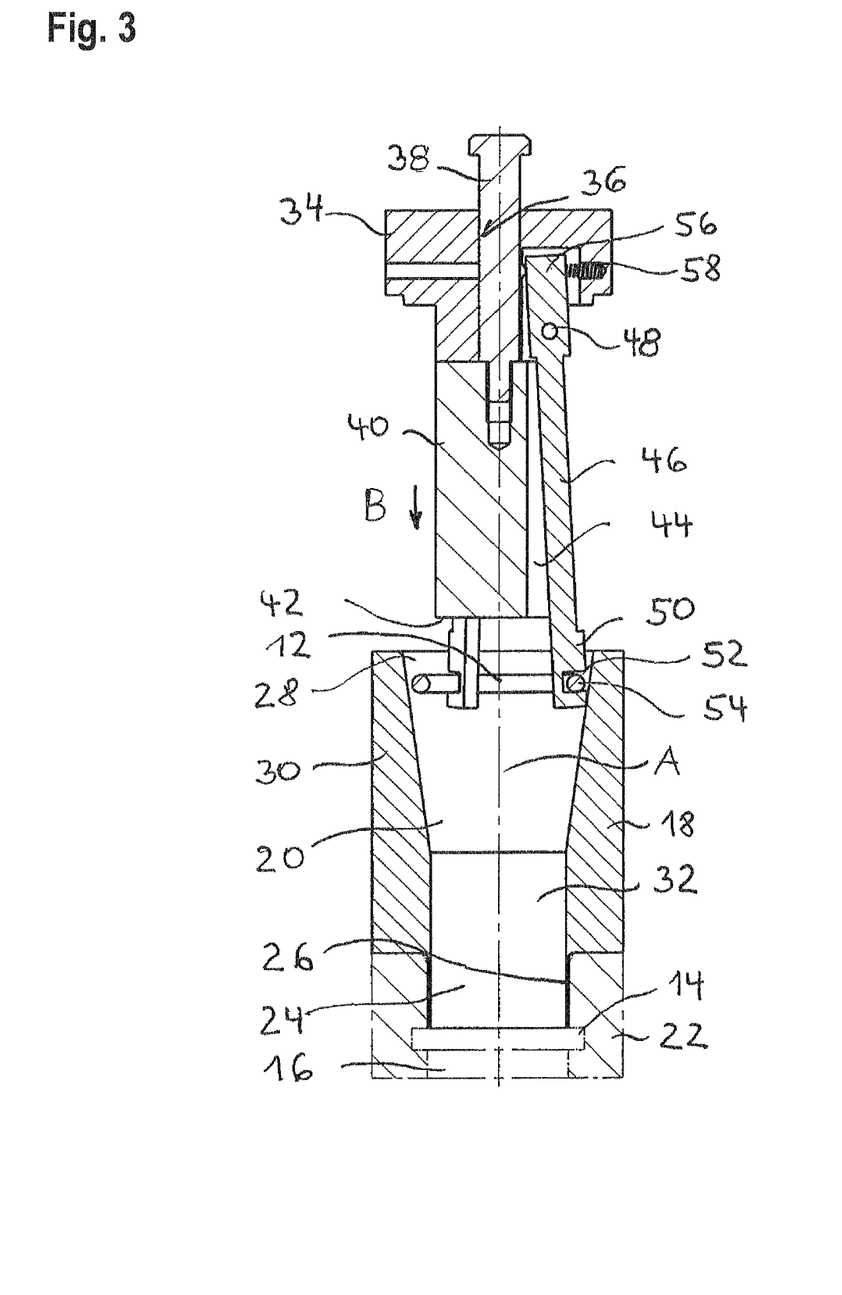
FIG. 3 illustrates a longitudinal sectional view through the device shown in FIG. 1.

As is evident in FIGS. 2 and 3, the guiding aperture 24 tapers from the inlet end 28 via a first region in the direction towards the outlet end 24. In the illustrated embodiment, the inner face of the corresponding wall 30 extends over one section in a conical manner, in this case in a cone-shaped manner, until it arrives at a circular-cylindrical section 32 after which the diameter of the guiding aperture 20 remains unchanged as far as the outlet end 24.

The device comprises furthermore a carrier 34 that is used to actuate and operate the device. The carrier 34 is configured in the present case by way of example essentially in the shape of a disc and has a guide 36 for an actuating plunger 38 of a slider 40, said guide being configured in a coaxial manner with the middle axis A of the guiding aperture 20 and the workpiece opening 16. The actuating plunger 38 protrudes through the guide 36 and has an actuating end, which protrudes at the rear face, and an opposite end that is coupled to the slider 40, by way of example is screwed into the slider 40 (see FIG. 3).

The slider 40 is an essentially cylindrical part (see FIGS. 1 and 2) that in the present embodiment comprises a planar end-face contact surface 42 that lies in a radial plane and faces in the direction towards the workpiece.

Multiple axial slots 44 are provided in the slider 40 and elongated, finger-like retainers 46 are at least in part received in said axial slots (see FIGS. 2 and 3).

Multiple retainers 46 and corresponding multiple slots 44 are provided distributed over the circumference of the slider 40 and in fact in this case in a uniform manner but theoretically also distributed in a non-uniform manner. In particular, three retainers 46 are provided.

The retainers 46 are in particular identical parts.

Furthermore, the retainers 46 are configured in this embodiment as rockers having two arms and a pivot bearing 48 in the carrier 34. The carrier 34 also has corresponding recesses for receiving or in part receiving the retainers 46 as is clearly shown in FIG. 3. The pivot bearing 48 sits moreover in the carrier 34 in such a manner that the retainer 46 can pivot radially outwards and inwards.

The retainers 46 have a long arm that extends from the pivot bearing 48 as far as a first end 50 that in this case becomes optionally thicker in the radial direction. The first end 50 has a radially outwards open recess 52 for an elastic ring 12, in this case a sealing ring. In the illustrated embodiment that is not to be regarded as limiting, the first end 50 in the region of the recess 52 is configured in a radially outwards open manner and in the shape of a letter C.

An actuator can engage with the retainer 46 between the pivot bearing 48 and the opposite second end 56 of each retainer 46, wherein a resilient actuator 58 is provided symbolically in the present embodiment and said resilient actuator sits in the carrier 34 and influences the retainer 46 in such a manner that its first end 50 strives to pivot outwards.

Each retainer 46 has a radial orientation with regard to its pivotability and also a corresponding actuator 58.

In the embodiment illustrated in FIGS. 2 and 3, the elastomer ring 12 is inserted into the recesses 52 of the three retainers 46. Those regions of the ring 12 that lie in the recesses 52 form the retaining regions 54 of the ring 12.

The manner in which the retainers 46 deflect outwards is adapted to suit the mountable ring sizes in such a manner that if the retainers 46 are pivoted outwards and not yet inserted into the mouthpiece 18, all the rings 12 that can be installed by means of the device are expanded in the outwards direction by virtue of the resilient effect of the retainers 46 and consequently sit in a loss-proof manner in the recesses 52.

Subsequently as evident in FIGS. 2 and 3, the unit comprising the carrier 34, the slider 40 and the retainers 46 together with the received ring 12 is pushed into the mouthpiece 18, wherein the guiding aperture 20 is greater in the region of the inlet end 28 than the sections of the retainers 46 that lie radially the furthest outwards (to be more precise their circular-cylindrical peripheries).

The previously mentioned unit is inserted deeper into the guiding aperture 20 so that the retainers 46 lie in the region adjacent to their recesses 52 against the inner face of the wall 30 and the wall of the mouthpiece 18 thus closes the recesses 52 at least to the extent that the ring can no longer slide out of the recesses 52 despite the deflection of the retainers 46 in the region of the first ends 50.

Figure 4:
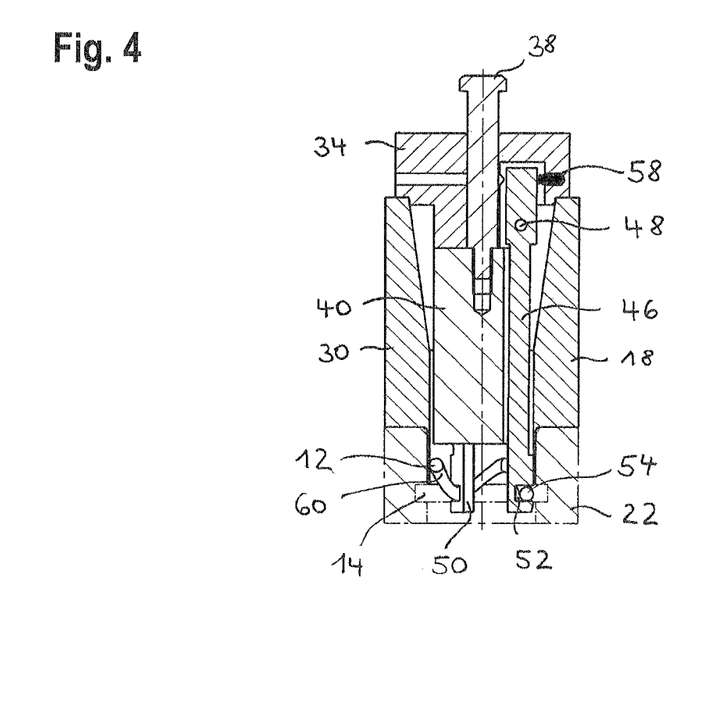
FIG. 4 illustrates a longitudinal sectional view through the device shown in FIG. 1 in a subsequent method step, during the insertion procedure into the workpiece opening.
Figure 5:
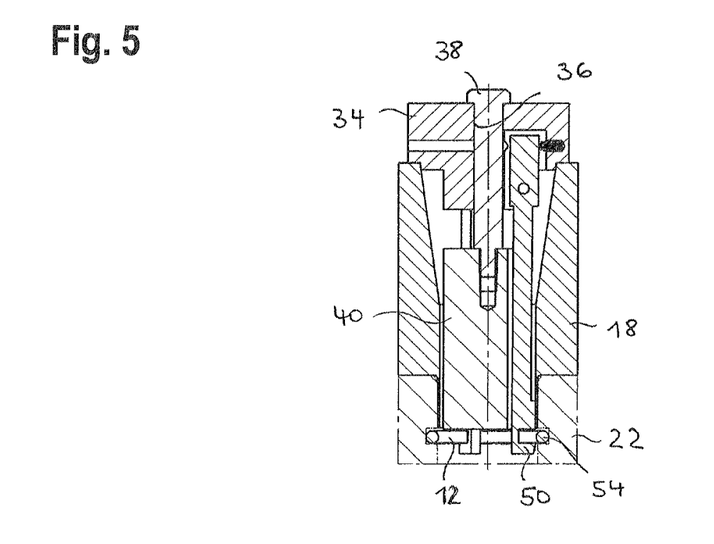
FIG. 5 illustrates a longitudinal sectional view through the device shown in FIG. 1 when the installation procedure is completed.

As the tapering of the guiding aperture 20 increases, the friction of the regions of the ring 12 between the retaining regions 54 against the inner face of the wall 30 is always greater which leads to these regions becoming curved in the direction opposite to the insertion direction B of the aforementioned unit and, as is evident in FIG. 4, trailing, curved regions 60 are produced between the retaining regions of the ring 12.

If the ring 12 has then arrived at the circular-cylindrical section 32 of the guiding aperture 20, said ring has a wavy shape or crown shape, in other words its outer diameter is reduced, but it is curved in the axial direction out of the earlier ring plane.

The unit comprising the retainers 46 and the trailing slider 40 is moved continuously deeper into the guiding aperture 20 until the retainers 46 eventually draw the ring 12 into the workpiece opening 16 and as far as the groove 14, as is illustrated in FIG. 4. The carrier 34 then impinges at the end face against the mouthpiece 18. The length of the retainers 46 and the position of their recesses 52 are adapted to suit the device and to suit the axial position of the groove 14 in the workpiece opening 16 in such a manner that, upon arriving at the stop, the recesses 52 lie axially at the level of the groove 14.

In the case of the illustrated embodiment, all the recesses 52 lie in a common radial plane so that, in the position in accordance with FIG. 4, all the retaining regions 54 of the ring 12 lie in the groove region and the retaining regions 54 jump into the groove 14 as a result of the intrinsic elasticity of the ring 12.

In the case of the illustrated embodiment, all the retainers 46 are moved axially simultaneously, they can however also be moved axially one after the other or the recesses 52 could lie axially offset with respect to one another. It is also feasible to move the retainers simultaneously jointly in groups.

In order to move the trailing, curved regions to the axial level of the groove 14 so that said regions push into the groove 14, the slider 40 that has previously been moved simultaneously with the retainers 46 is subsequently set into motion separately.

As is evident in FIG. 3, the contact surface 42 lies in the starting position axially offset from the recesses 52 since these protrude in the direction towards the workpiece 22 opposite the slider 40.

By virtue of actuating the actuating plunger 38 in the insertion direction B, the slider is subsequently moved downwards towards the curved regions 60 of the ring 12, contacts said regions with the contact surface 42 and pushes them finally towards the groove 14 where they can then spring radially outwards and move into the groove. In this position, a stop for the slider 40 is then also provided, in this case by way of example by means of a head on the actuating plunger 38.

The entire device can now be removed from the workpiece 22.

The installation procedure by means of the device can be performed in a completely automated and motorized manner by means of correspondingly providing actuators for the retainers 46, for the slider 40 and for the carrier 34. In order to be able to forego the relevant motors, moving parts can be coupled to one another mechanically also in a rigid or pivotable manner by means of sliding guides or rods. Pneumatic actuators in particular can be used as actuators but hydraulic or electric actuators can also be used.

Figure 7:
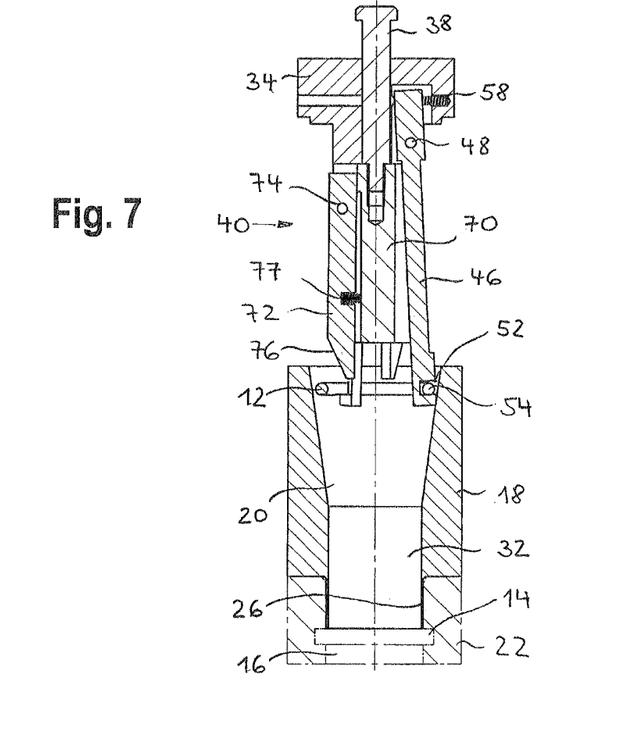
FIG. 7 illustrates a longitudinal sectional view through the device shown in FIG. 6 prior to inserting the ring into the workpiece.
Figure 8:
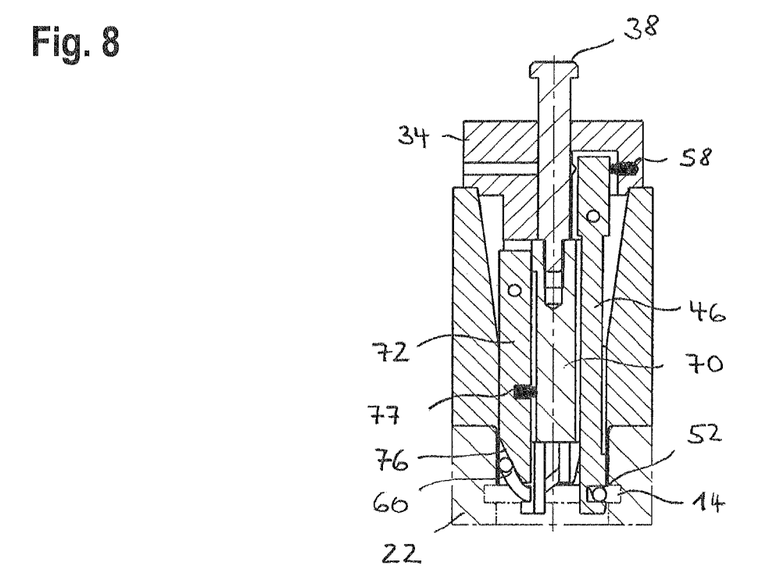
FIG. 8 illustrates a longitudinal sectional view through the device shown in FIG. 6 in a subsequent method step, during the insertion procedure into the workpiece opening.
Figure 9:
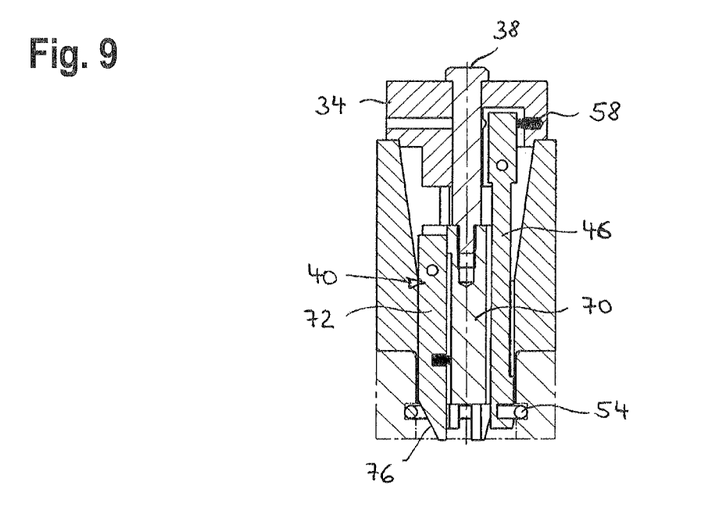
FIG. 9 illustrates a longitudinal sectional view through the device shown in FIG. 6 when the installation procedure is completed.
Figure 10:
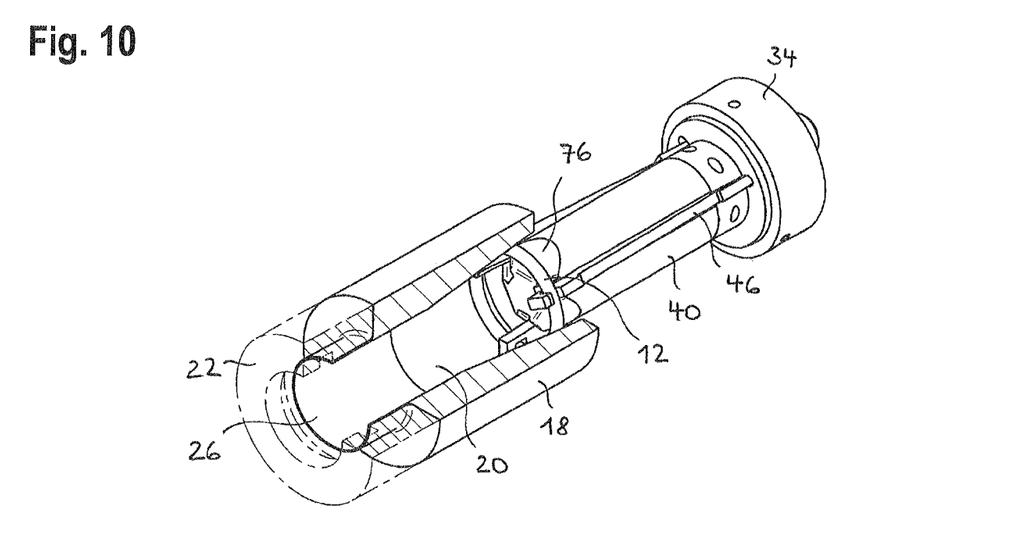
FIG. 10 illustrates a partial sectional view through the device in accordance with the invention in accordance with the third embodiment corresponding to the view shown in FIG. 2.
Figure 11:
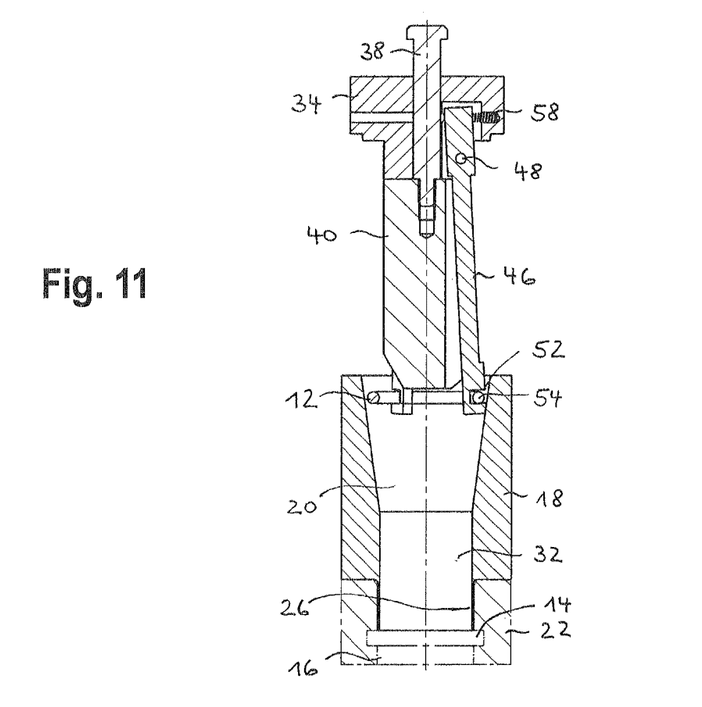
FIG. 11 illustrates a longitudinal sectional view through the device shown in FIG. 10 prior to inserting the ring into the workpiece.

The second embodiment illustrated in FIGS. 7 to 9 essentially corresponds to the first embodiment so that hereinafter only the differences are mentioned.

The difference provided in this case resides in the embodiment of the slider 40. The slider 40 is configured in this case from more than one part, the slider having a central base body 70, which is essentially a rod shape and on which the plunger 38 is fastened. Slider fingers 72 are distributed on the circumference of the base body 70, said slider fingers being configured as rockers and being mounted with their pivot bearing 74 in slots in the base body 70 in such a manner that they can pivot radially outwards and inwards.

An actuator 77 is also provided in this case, by way of example in the form of a resilient element that strives to pivot its slider finger 72 radially outwards. It is naturally also possible in this case to use other actuators, also active and switchable actuators, so as to achieve the pivot movement. The object is to achieve a fully-automated installation procedure by means of the illustrated device.

Figure 6:
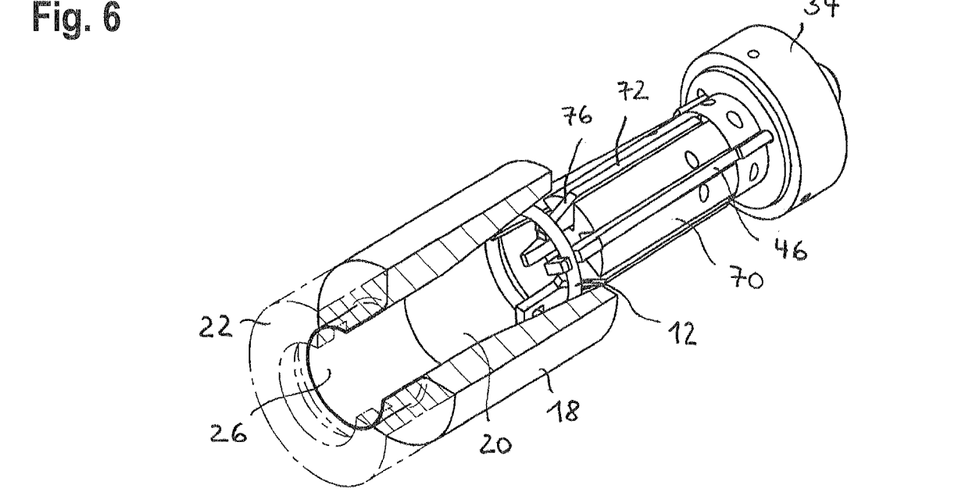
FIG. 6 illustrates a partial sectional view corresponding to FIG. 2 through a device in accordance with the invention in accordance with a second embodiment.

The actuators 77 operate between the slider fingers 72 and the base body 70, at least in the illustrated variant. The ends of the slider fingers 72 facing the workpiece 22 have on the outer face an inclined surface 76 that extends radially inwards towards their end and in their starting position end before the recesses 52 of the retainers 46 (see FIG. 7). The inclined surfaces 76 lie in such a manner when viewed in the axial direction that their ends lie radially inwards of the ring 12 (see also FIG. 6).

As has already been explained with reference to FIG. 3, the unit together with the ring 12 is pushed into the mouthpiece 18 until the recesses have arrived at the groove 14 (see FIG. 8) and the retaining regions 54 jump into the groove 14. Subsequently, the slider 40 is pushed downwards by way of the plunger 38, wherein the inclined surfaces 76 push the trailing curved regions 60 in the direction towards the groove and upon arriving at the groove 14 also push them outwards (see FIG. 9).

As a result of the resiliently engaged slider fingers 72, the fingers always lie on the inner face of the guiding aperture 20 and the inner face of the workpiece opening.

It is naturally necessary to adapt the inclination of the inclined surface 76 to suit the dimensions of the ring 12 so as not to jam or cut off said ring when the slider 40 is moved axially relative to the retainers 46 and the ring 12.

The embodiment according to the FIGS. 10 to 14 corresponds likewise to the previously described embodiment except for the following changes in the slider 40.

Figure 12:
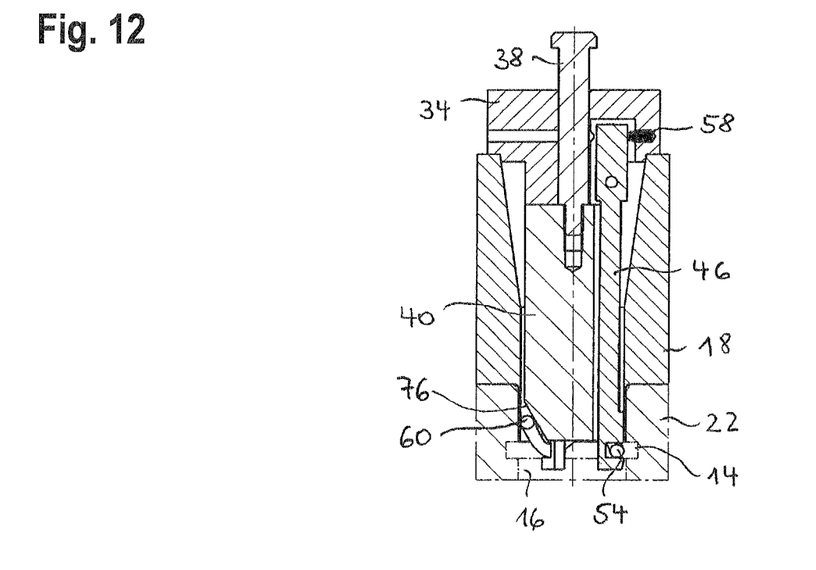
FIG. 12 illustrates a longitudinal sectional view through the device shown in FIG. 10, in a subsequent method step, during the insertion procedure into the workpiece opening.
Figure 13:
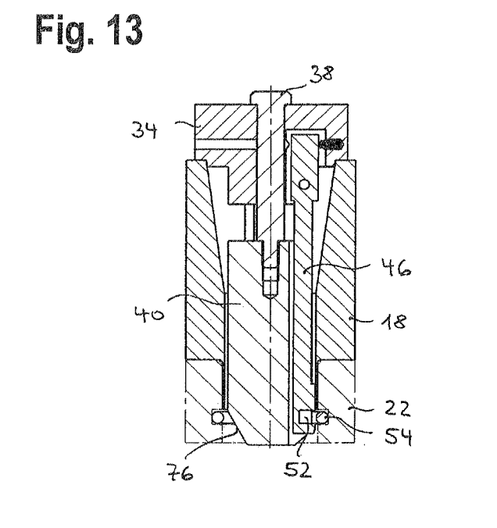
FIG. 13 illustrates a longitudinal sectional view through the device shown in FIG. 10 when the installation procedure is completed.
Figure 14:
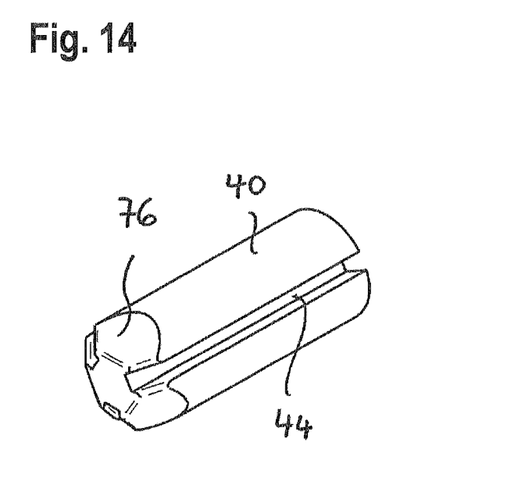
FIG. 14 illustrates a perspective view of the slider that is used in the third embodiment of the device in accordance with the invention.

The basic principle of the slider 40 in this case is similar to the slider 40 according to the first embodiment. However, the contact surface 42 is not as is seen in FIG. 3 lying in a radial plane with respect to the axis A and configured in a planar manner but rather said contact surface is configured as an inclined surface 76. As a result of the circular-cylindrical basic shape of the slider 40 (see also FIG. 14), an inclined surface 76 is produced that extends in a different length in the axial direction. The advantage hereby resides in the fact that the trailing curved regions 60 do not only lie against the inclined surface 76 in a point-like manner but rather lie on the inner face almost on their entire length against said inclined surface, as is indicated in FIG. 12.

Otherwise, the FIGS. 10 to 13 illustrate the different steps when inserting an elastic ring with the aid of the device in accordance with the third embodiment.

As a result of the multiple retainers 46 and their elasticity, above all, however, as a result of the three-dimensional wavy shape or crown shape of the ring 12 (said shape being produced by means of the device during the guiding procedure through the mouthpiece 18 and the workpiece opening 16) it is possible by means of the same device to install different rings in differently dimensioned grooves 14 and workpiece openings 16. It is also possible to provide spacers between the stops in order to adjust the axial position of the recess 52 and the slider 40 with respect to the groove 14. In the case of a motorized actuator, it is possible for a corresponding controller by way of example of a motor, in particular of a servomotor, to assume the task of stops.

Naturally, each device has only its specific range of dimensions of rings, grooves and diameters which can be handled by the device and with the aid of which corresponding rings can be mounted in the grooves. However, a modular construction system can be formed in a very simple manner in that different mouthpieces 18 that have different cross-sections of guiding apertures 20 are achieved, all of which can be coupled to the same unit comprising the retainers 46, the carrier 34 and the plunger 38. Moreover, in the case of the second embodiment, the effective diameter of the slider 40 can be varied by means of the resilient slider fingers 72. Naturally, these slider fingers can also be formed without the inclined surface 76 so that a contact surface that is lying in a radial plane is formed.

The invention claimed is:

1. A device for inserting an elastic ring into an inner groove in a workpiece opening, said device having:
   at least two retainers that are circumferentially spaced apart from one another and can slide into the workpiece opening with regard to an axial insertion direction (B), each of said retainers having a radially outwards open recess for retaining regions on the ring,
   wherein the device is configured so that the ring that sits in the recesses can deform between its retaining regions to form a wavy shape, seen in a lateral view, in order to form trailing, curved regions,
   at least one slider for pushing the trailing, curved regions in the direction towards the inner groove, wherein the device is configured such that the slider can be moved into the workpiece opening in a trailing manner with respect to the recesses, and
   wherein a mouthpiece is provided with a guiding aperture for the ring to be pushed through in the direction towards the workpiece and for deforming the ring, wherein the retainers together with the inserted ring and the slider can be pushed axially through the guiding aperture.

2. The device according to claim 1, wherein the guiding aperture tapers in a conical or cone-shaped manner or comprises ribs that protrude on an inner face and whose radial inner face extends in the direction towards the outlet end closer to the middle axis (A) of the guiding aperture at least in sections.

3. The device according to claim 2, wherein the ribs are sliding strips that are mounted on a wall of the mouthpiece.

4. The device according to claim 1, wherein the guiding aperture comprises an outlet end that is facing the workpiece and an inlet end facing away from the workpiece, wherein the guiding aperture tapers at least in sections in the direction towards the outlet end.

5. A device for inserting an elastic ring into an inner groove in a workpiece opening, said device having:
   at least two retainers that are circumferentially spaced apart from one another and can slide into the workpiece opening with regard to an axial insertion direction (B), each of said retainers having a radially outwards open recess for retaining regions on the ring,
   wherein the device is configured so that the ring that sits in the recesses can deform between its retaining regions to form a wavy shape, seen in a lateral view, in order to form trailing, curved regions,
   at least one slider for pushing the trailing, curved regions in the direction towards the inner groove, wherein the device is configured such that the slider can be moved into the workpiece opening in a trailing manner with respect to the recesses, and
   wherein the retainers are prestressed radially outwards in a resilient manner.

6. The device according to claim 5, wherein a carrier is provided on which the retainers are mounted.

7. The device according to claim 6, wherein the carrier has a guide for the at least one slider.

8. The device according to claim 5, wherein some or all the recesses lie in the same radial plane.

9. The device according to claim 5, wherein the retainers are circumferentially distributed in one of a uniform and non-uniform manner.

10. The device according to claim 5, wherein the at least on slider and the retainers can be moved at least one of axially one after the other and independently of one another.

11. The device according to claim 5, wherein the retainers all together, jointly in groups or independently of one another, are mounted in such a manner as to be able to move in an axial and/or radial manner relative to the rest of the device.

12. The device according to claim 5, wherein at least one actuator is provided for moving the retainers relative to the rest of the device.

13. The device according to claim 5, wherein the retainers can be moved radially outwards in the region of the recesses.

14. The device according to claim 5, wherein the at least one slider is arranged radially between the retainers at least during the insertion movement into the workpiece opening.

15. The device according to claim 5, wherein the slider has radially outwards movable contact surfaces so as to change a radial expansion of the slider, the contact surfaces being inclined surfaces.

16. A device for inserting an elastic ring into an inner groove in a workpiece opening, said device having:
   at least two retainers that are circumferentially spaced apart from one another and can slide into the workpiece opening with regard to an axial insertion direction (B), each of said retainers having a radially outwards open recess for retaining regions on the ring,
   wherein the device is configured so that the ring that sits in the recesses can deform between its retaining regions to form a wavy shape seen in a lateral view, in order to form trailing, curved regions,
   at least one slider for pushing the trailing curved regions in the direction towards the inner groove, wherein the device is configured such that the slider can be moved into the workpiece opening in a trailing manner with resect to the recesses, and
   wherein the retainers are mounted to a carrier in a pivotable manner.

17. The device according to claim 16, wherein the slider has contact surfaces contacting the ring, the contact surfaces being configured as inclined surfaces arranged to push the trailing curved regions of the ring towards and into the groove.

18. The device according to claim 16, wherein in that the slider is a multi-part construction and has slider fingers which are mounted so as to be pivotable radially outwards and inwards and which comprise inclined surfaces, the ends of the slider fingers facing the workpiece having the inclined surfaces which extend radially inwards towards the end of an associated slider finger, and the ends of the inclined surfaces, viewed in the axial direction, lying radially inwards of the ring.

19. A device for inserting an elastic ring into an inner groove in a workpiece opening, said device having:
- at least two retainers that are circumferentially spaced apart from one another and can slide into the workpiece opening with regard to an axial insertion direction (B), each of said retainers having a radially outwards open recess for retaining regions on the ring,
- wherein the device is configured so that the ring that sits in the recesses can deform between its retaining regions to form a wavy shape, seen in a lateral view, in order to form trailing, curved regions,
- at least one slider for pushing the trailing, curved regions in the direction towards the inner groove, wherein the device is configured such that the slider can be moved into the workpiece opening in a trailing manner with respect to the recesses, and
- wherein the at least one slider comprises a slot for receiving at least one retainer.

20. A modular construction system having a device with
- at least two retainers that are circumferentially spaced apart from one another and can slide into a workpiece opening with regard to an axial insertion direction (B), each of said retainers having a radially outwards open recess for retaining regions on a ring,
- wherein the device is configured so that the ring that sits in the recesses can deform between its retaining regions to form a wavy shape, seen in a lateral view, in order to form trailing, curved regions,
- at least one slider for pushing the trailing, curved regions in the direction towards an inner groove, wherein the device is configured such that the slider can be moved into the workpiece opening in a trailing manner with respect to the recesses, and
- multiple mouthpieces, each mouthpiece having a guiding aperture for the ring to be pushed through in the direction towards the workpiece opening and for deforming the ring and each having an axial outlet end, wherein the retainers together with the inserted ring and the slider can be pushed axially through the guiding aperture, wherein
- the mouthpieces differ from one another by virtue of different diameters of the guiding apertures in the region of the axial outlet end, wherein the slider and the retainers can be coupled to each of the mouthpieces so that during the insertion procedure the retainers can make contact adjacent to their recesses with an inner face of a wall of the mouthpiece, said wall forming the guiding apertures.

* * * * *

UNITED STATES PATENT AND TRADEMARK OFFICE
CERTIFICATE OF CORRECTION

PATENT NO. : 10,478,951 B2
APPLICATION NO. : 15/586106
DATED : November 19, 2019
INVENTOR(S) : Coelestin Ohrmann Page 1 of 1

It is certified that error appears in the above-identified patent and that said Letters Patent is hereby corrected as shown below:

In the Claims

Claim 10, Column 12, Line 29 "at least on slider" should be --at least one slider--

Claim 16, Column 12, Line 63 "with resect to" should be --with respect to--

Signed and Sealed this
Eleventh Day of February, 2020

Andrei Iancu
*Director of the United States Patent and Trademark Office*